United States Patent Office 3,606,352
Patented Sept. 20, 1971

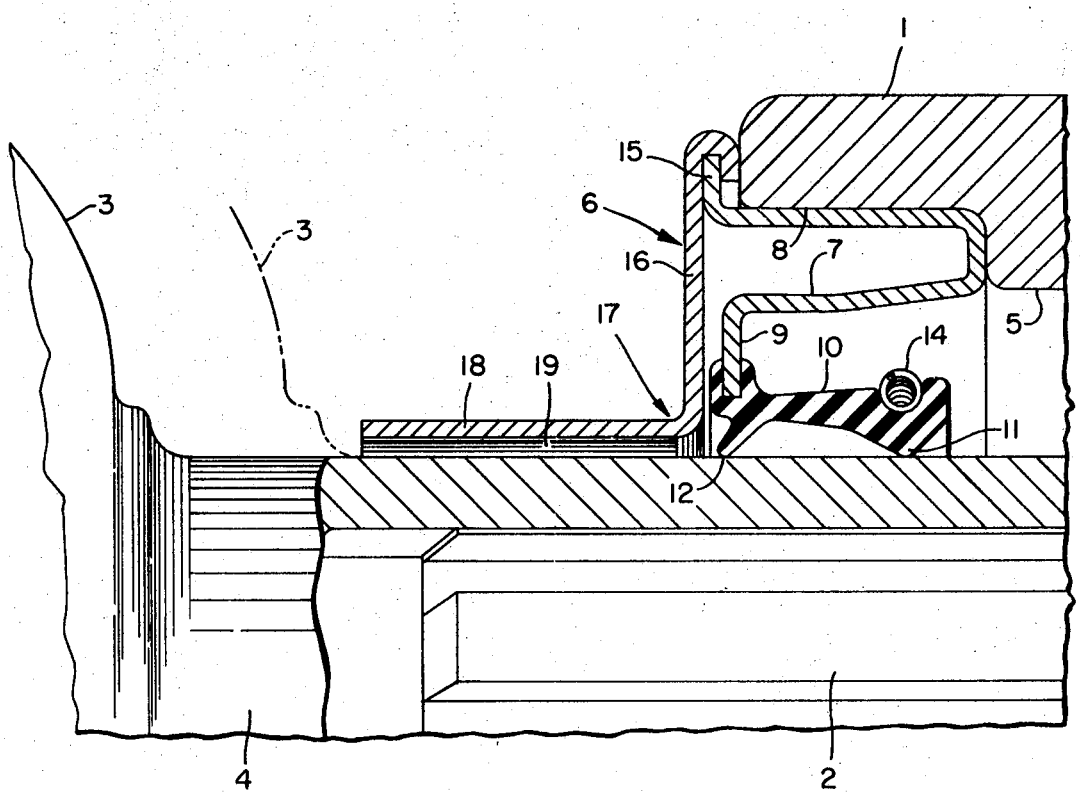

3,606,352
FLUID SEAL ASSEMBLY
Walter A. Lutz, Lexington, Ky., assignor to
Parker-Hannifin Corporation, Cleveland, Ohio
Filed Apr. 18, 1969, Ser. No. 817,319
Int. Cl. F16j 9/06; F02f 5/00
U.S. Cl. 277—32                                         3 Claims

ABSTRACT OF THE DISCLOSURE

A fluid seal assembly having a sealing portion adapted to be mounted in a housing to make fluid sealing engagement with a reciprocating and/or rotating shaft which extends into said housing, said assembly also having a rigid tubular shield portion which extends axially along said shaft to protect the latter from scratching, marring, or other damage thus to prolong the life of the sealing portion of said assembly, but without impeding rotation and reciprocation of said shaft.

BACKGROUND OF THE INVENTION

In known fluid seal assemblies of the type aforesaid, the extensions or shield portions have been in the form of flexible boots of rubber-like material which, at their axially outer ends, are engaged by the shaft and are thus collapsed and uncollapsed axially and rotationally twisted during reciprocation and rotation of the shaft. Accordingly, repeated collapsing and uncollapsing of such boot-like extension and rotational friction may shorten the life of the seal assembly. Furthermore, in the case of use of the seal assembly in an automotive transmission extension housing-universal slip yoke joint, such flexible boot does not protect the shaft portion of the yoke from possible damage by flying objects such as stones or the like, which may be encountered during the use of the vehicle, whereby the shaft portion may be marred or dented in a region which is adapted to be contacted by the sealing portion of the assembly.

SUMMARY OF THE INVENTION

Contrary to the foregoing, the fluid seal assembly herein has a fluid sealing portion resiliently contacting the reciprocating and/or rotating shaft and has a rigid tubular shield portion around the shaft which is in close proximity to the shaft, but out of contact therewith, thus to shield the sealing portion of the shaft from scratching, marring or other damage thus to prolong the life of the sealing portion, this being a principal object of the present invention.

Other objects and advantages of the present invention will become apparent as the following description proceeds.

BRIEF DESCRIPTION OF THE DRAWING

The single figure of the drawing is a fragmentary radial cross-section view, on enlarged scale, of a preferred embodiment of the invention.

DISCUSSION OF THE INVENTION

In the drawing, the reference numeral 1 denotes the rear end portion of an automobile transmission extension housing which has an output shaft 2 radially spaced therewithin and projecting axially therebeyond. A universal joint slip yoke 3 is splined on said output shaft 2 for driving by the latter and for axial reciprocation thereon.

The yoke 3 has a shaft portion 4 which is radially spaced from the bore 5 of the extension housing 1. To seal the joint between the yoke shaft portion 4 and the housing 1 there is provided a fluid seal assembly 6 including a flanged sheet metal case 7 which is press-fitted into a counterbore 8 in the end of the housing 1. Bonded to the inturned flange 9 of the case 7 is a sealing member 10 of rubber-like material which is provided with axially spaced apart sealing and auxiliary lips 11 and 12, the sealing lip 11 being spring-loaded against the shaft portion 4 of the yoke 3 as by means of the garter spring 14 which is disposed in a peripheral groove of the sealing member 10. The auxiliary lip 12 also contacts the shaft portion 4 and acts as a dirt excluder or wiper. Preferably, the axial spacing between the lips 11 and 12 is the same as, or greater than, the axial reciprocation stroke of the yoke 3 between the solid and dot-dash lines.

Curled over the radially outwardly extending flange 15 of the case 7 is the radially inwardly flange 16 of a shield member 17 which has an axially extending tubular shield portion 18 which is adjacent the dirt excluding lip 12 and extends axially rearward therefrom in close proximity to, but out of contact with, the shaft portion 4 of the yoke 3. Preferably, the radial clearance space 19 between the shield portion 18 and the shaft 4 may be about $\frac{1}{64}''$ whereby even if the portion 18 be slightly out of round or eccentric, it will yet remain out of contact with the shaft 4. The length of the tubular shield 18 from the dirt excluding lip 12 is at least equal to the stroke of the yoke 3 and, preferably, such length is somewhat greater as shown in the drawing so that when the yoke 3 reciprocates between its outermost solid line position and innermost dot-dash line positions, the portion of the shaft 4 engaged by the dirt excluding lip 12 will never be exposed to scratching, marring, or other damage.

Likewise, when the spacing of the sealing lip 11 and the dirt excluding lip 12 is as aforesaid, the portion of the shaft 4 which is engaged by the sealing lip 11 will never be spaced rearwardly beyond the dirt excluding lip 12, and therefore, the sealing lip 11 will, in all positions of the yoke 3, engage a portion of the shaft 4 forwardly of the dirt excluding lip 12.

I, therefore, particularly point out and distinctly claim as my invention:

1. A fluid seal assembly comprising a ring-like sheet metal case having radially spaced outer and inner axial flanges integrally connected at one end for press fitting of said outer flange in a bore in a transmission extension housing, said outer and inner flanges having at their other end a radially outwardly and a radially inwardly extending flange respectively; a sealing ring of rubber-like material secured to said radially inwardly extending flange and having axially spaced apart sealing and dirt excluding lips adapted to make contact with the shaft of a universal joint slip yoke; and a rigid tubular shield member axially adjacent said sealing ring having a radially outwardly extending flange adjacent said dirt excluding lip which, at its outer periphery, is curled over the radially outwardly extending flange of said case thus to secure said shield member to said case, the inside diameter of said shield member being greater than the diameter of said lips so that said shield member will extend axially along the shaft in close proximity thereto, but out of contact therewith, thus to protect the shaft from scratching, marring or other damage without impeding rotation and axial reciprocation of said yoke.

2. The assembly of claim 1 wherein said shield member is of axial length at least as great as the axial spacing of said lips.

3. A fluid seal assembly comprising a ring-like sheet metal case having radially spaced outer and inner axial flanges integrally connected at one end for press fitting of said outer flange in a bore in a transmission extension housing, said outer and inner flanges having at their other end a radially outwardly and a radially inwardly extending flange respectively; a sealing ring of rubber-like material secured to said radially inwardly extending flange and having a sealing portion adapted to make contact with the shaft of a universal joint slip yoke; and a rigid tubular shield member axially adjacent to said sealing ring having a radially outwardly extending flange adjacent to said sealing portion which, at its outer periphery, is curled over the radially outwardly extending flange of said case thus to secure said shield member to said case, the inside diameter of said shield member being greater than the diameter of said sealing portion so that said shield member will extend axially along the shaft in close proximity thereto, but out of contact therewith, thus to protect the shaft from scratching, marring or other damage without impeding rotation and axial reciprocation of said yoke.

References Cited

UNITED STATES PATENTS

| | | | |
|---|---|---|---|
| 2,070,126 | 2/1937 | Heinze | 277—58X |
| 2,871,037 | 1/1959 | Johnson et al. | 277—153 |
| 2,983,125 | 5/1961 | Peickii et al. | 277—153X |
| 3,392,226 | 7/1968 | McKinven, Jr. | 277—153X |
| 3,276,783 | 10/1966 | McKinven, Jr. | 277—50 |

SAMUEL B. ROTHBERG, Primary Examiner

U.S. Cl. X.R.

277—58, 153